United States Patent [19]

Tarumi et al.

[11] 4,430,661

[45] Feb. 7, 1984

[54] METHOD AND APPARATUS FOR IMAGE REPRODUCTION

[75] Inventors: Noriyoshi Tarumi; Masahiko Matsunawa; Hiroshi Tokunaga, all of Hachioji, Japan

[73] Assignee: Konishiroku Photo Industry Co., Ltd., Japan

[21] Appl. No.: 265,353

[22] Filed: May 20, 1981

[30] Foreign Application Priority Data

May 26, 1980 [JP]  Japan .................................. 55-69000

[51] Int. Cl.³ ............................................. G01D 15/06
[52] U.S. Cl. ............................. 346/153.1; 355/3 CH; 355/14 CH
[58] Field of Search ............. 355/3 R, 3 CH, 14 CH, 355/77; 346/153.1

[56] References Cited

U.S. PATENT DOCUMENTS

| | | | |
|---|---|---|---|
| 4,257,051 | 3/1981 | Lindsay et al. | 346/153.1 X |
| 4,267,556 | 5/1981 | Fotland et al. | 355/3 R X |
| 4,268,160 | 5/1981 | Muramatsu | 346/153.1 X |

FOREIGN PATENT DOCUMENTS 55-50265  4/1980  Japan .................................. 346/153.1

Primary Examiner—Fred L. Braun
Attorney, Agent, or Firm—Jordan B. Bierman; Linda Bierman; C. Cornell Remsen, Jr.

[57] ABSTRACT

A method for image reproduction using an ion modulation electrode adapted to form images on a charge receptor. The ion modulation electrode is divided into a plurality of groups, and digital or analog image signals are held in element corresponding to the group and are formed parallel signals, and the parallel signals are applied to respective groups. The ion modulation electrode includes a continuous layer of conductive material, a segmented layer of conductive material and an insulating layer interposed therebetween. An image reproducing apparatus which includes an ion generator, an ion modulation electrode dividing electrically into a plurality of groups and modulating ion flow generated the ion generator, and a charge receptor receiving modulated ion flow. To the groups are applied image signals which are held in element corresponding to group and are formed parallel signals.

9 Claims, 2 Drawing Figures

PRIOR ART
FIG. I

METHOD AND APPARATUS FOR IMAGE REPRODUCTION

BACKGROUND OF THE INVENTION

1. Field of the Invention:

The present invention relates to a method for image reproduction using an ion modulation electrode.

2. Description of the Prior Art:

An image reproducing device has been known as a device adapted to reproduce on a recording sheet image signals of information derived from a computer or transmitted through a communication line or, information which is obtained through converting an original image into electric signals by means of a solid state image sensor such as CCD.

Various types of the electrostatic devices have been proposed up to now. In electostatic reproduction, a latent image corresponding to the image signal is formed on a charge receptor, such as a photosensitive member, dielectric member or recording paper. As a means for forming the latent image, it has been proposed to use an ion modulation electrode which is adapted to modulate the corona ions produced by a corona wire or the like in accordance with the image signal, thereby to form a latent image corresponding to the image signal on a dielectric body.

FIG. 1 schematically shows an example of construction of the image reproducing device of the type described. This device has an illumination lamp 2 adapted to illuminate a document M mounted on a document glass plate 1. The light reflected by the document M is applied to a CCD 5 through a mirror 3 and a lens 4 to obtain an image signal corresponding to the document image. The image signal coming from the CCD 5 is applied after being amplified by an amplifier 6, to a signal processing circuit 7. The output information from the computer and information from a communication line are directly applied to the signal processing circuit 7. The image signal processed by the processing circuit 7 is applied to an ion modulation electrode driving circuit 8.

The ion modulation electrode 9 has an insulating layer sandwiched between a continuous layer 9a of a conductive material and segmented layer 9b of a conductive material, and is provided with a plurality of apertures 9c arranged in a row. An image signal corresponding to the image information to be reproduced is applied from the driving circuit 8 to the segmented layer 9b of conductive material, and is scanned by controlling the potential of segmented layer 9b by the potential of said layer 9a. A reference numeral 10 denotes a control circuit including a clock signal generator, which is adapted to apply the clock signal and a control signal to the CCD 5, signal processing circuit 7 and the driving circuit 8. Ion generator 11 is disposed above the ion modulation electrode 9, and a rotary drum 12 is disposed under the ion modulation electrode 9; the surface of rotary drum is covered a dielectric member. A developing device 13, transfer electrode 14, separating device 15, charge eliminating electrode 16 and a cleaning device 17 are disposed around the rotary drum 12 as in an ordinary electrophotographic process. A fixing device 18 is also provided as known per se. The ions generated by an ion generator 11 pass through the apertures 9c at a rate controlled by the control signal applied to the segmented layer 9b of conductive material of the ion modulation electrode 9, so that a latent image corresponding to the image information to be reproduced is formed on the dielectric member of the rotary drum 12. The electrostatic latent image thus formed is transferred to a recording paper P by means of the transfer electrode 14 on which the image has been developed by the developer by means of the developing device 13. The recording paper P is then separated from the rotary drum 12 by means of the separating device 15, and is ejected to the outside of the apparatus after the fixing of the toner image by the fixing device 18.

An image reproducing method using the ion modulation electrode produces an image of a high quality with a high resolution and good half tone reproduction, but suffers the disadvantage of low recording speed. This is attributable to the following two reasons: namely, (1) practical limit in current density of the corona ions (several tens of microamperes per square centimeter) and (2) a practical lower limit in ion modulating time due to ion mobility. In order to enhance the recording speed, it has been suggested to increase the density of the ion flow. This measure, however, requires a higher voltage for the ion generator, which in turn requires a power supply of higher voltage and increases the tendency of sparking discharge. To avoid this, it is necessary to employ a higher degree of electric insulation.

It has also been suggested to use an image signal holding technic which is generally adopted in the field of facsimile employing an electrostatic reproducing method using multi-stylus electrodes. In this method, the image signals received serially are not successively given to the multi-stylus electrodes but are temporarily stored and, after an accumulation of predetermined number of signals, applied to the multi-stylus electrodes. By so doing, it is possible to obtain a longer ion modulating time and to increase the recording speed.

However, in the formation of an electrostatic latent image by using the ion modulation electrodes, it takes a definite time for the ions produced by the ion generator to pass through the apertures of the ion modulation electrode, because the gap (20 to 100 $\mu$m) between the continuous layer and segmented layer of the conductive material is greater than the discharge gap of the multi-stylus electrodes.

For this reason, there is a practical limit in the frequency of the image signal capable of reproducing the image. For instance, in the case of an ion modulation electrode of a thickness of 0.1 mm, the limit frequency is about 250 KHz under the electric field of 2.5 KV/cm, provided that the mobility of ion in the air is 2 cm/V sec. Thus, there is a practical upper limit of frequency of the image signal in the electrostatic reproducing using an ion modulation electrode.

A detailed description will be made hereinunder as to the upper limit of the frequency of the image signal.

The upper limit frequency is given by the following equation (1)

$$f\text{max} = \mu \cdot E/2d \tag{1}$$

where, $\mu$ represents the mobility of ion in the air, E represents the strength of electric field in the ion modulation electrode, d represents the thickness of the ion modulation electrode including the continuous layer of conductive material, segmented layer of conductive material and the insulating layer sandwiched therebetween.

The mobility of the ion in the air is about 2 cm²/V sec. Assuming that the strength E of the electric field is 2.5 KV/cm and that the thickness d is 0.1 mm, the upper limit frequency f max is calculated to be 250 KHz. Particularly, in the case where an ion modulation electrode 5 is used, the upper limit of the frequency of the image signal is determined to be about 250 KHz. This upper limit of the frequency is a critical factor in obtaining higher recording speed.

SUMMARY OF THE INVENTION

In view of the above, the present invention aims as its object to increase the recording speed while permitting the use of a higher frequency.

To this end, according to the invention, the ion modulation electrode is divided into a plurality of groups and the holding of the image signal is made in each group independently.

Other objects and advantageous features of the invention will become more clear from the following description of the preferred embodiment taken in conjunction with the accompanying drawings.

DESCRIPTION OF THE PREFERRED EMBODIMENT

Figure 1:
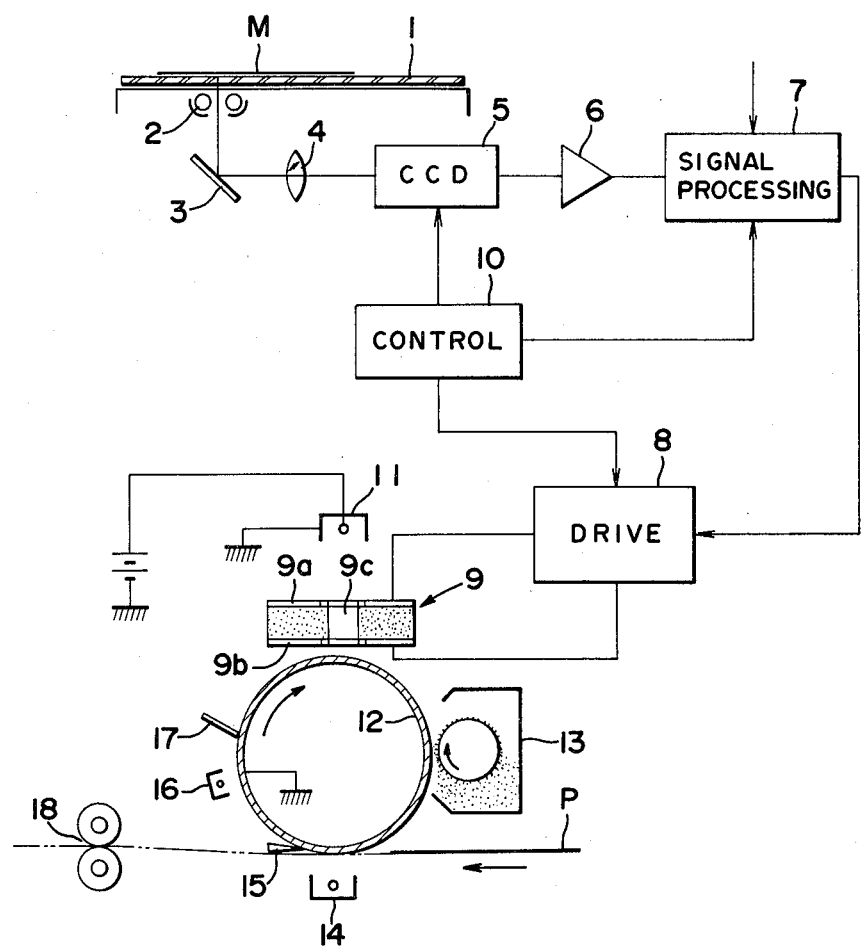
FIG. 1 is a schematic illustration of an image reproducing device incorporating an ion modulation electrode according to the prior art.
Figure 2:
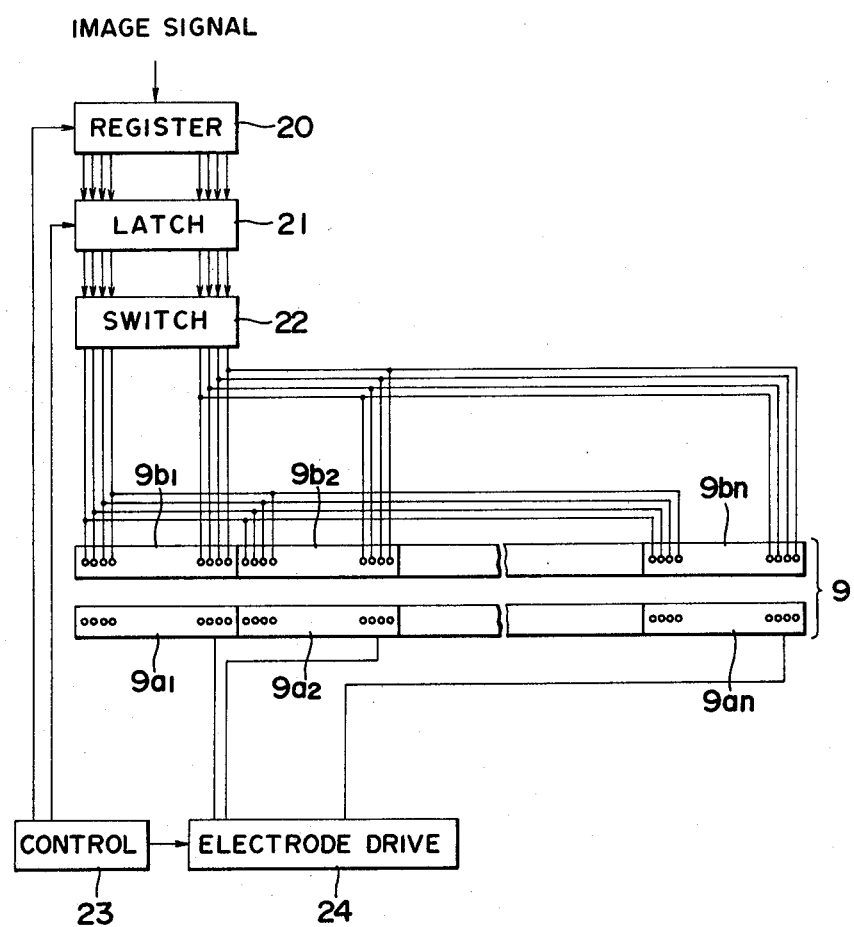
FIG. 2 is an electric block diagram of a control circuit in accordance with an image reproducing arrangement of the invention.

FIG. 2 is an electric block diagram of a novel control circuit for carrying out the method of the invention. The ion modulation electrode 9 is divided into a plurality of groups. In the illustrated embodiment, there are n groups. The continuous layer of conductive material and segmented layers of conductive material of respective groups are designated as $9a1, 9a2, \ldots 9an$ and $9b1, 9b2, \ldots 9bn$, respectively. The control circuit has a shift register 20 adapted to receive an image signal from the signal processing circuit 7 shown in FIG. 1, a latch circuit 21 for holding the output image signal from the shift register 20, a switching circuit 22 adapted to supply the image signal held by the latch circuit 21 in a switching manner to the segmented layers $9b1, 9b2, \ldots 9bn$ of the ion modulation electrode 9, a command signal generating circuit 23 for applying an output command signal to the shift register 20 and the latch circuit 21, and a continuous layer driving circuit 24 for applying a voltage to the continuous layers $9a1, 9a2, \ldots 9an$ of the ion modulation electrode 9.

It is contemplated that the whole portion of the control circuit, except the command signal generating circuit 23, is included in the ion modulation electrode driving circuit 8. It is also contemplated that the command signal generating circuit 23 corresponds to the control circuit 10 including the clock signal generating device all as shown in FIG. 1.

In the event that the image signal is a digital signal, this image signal is successively applied to the shift register 20 in accordance with the command signal derived from the command signal generating circuit 23, and the content of the shift register 20 is applied to the latch circuit 21 in accordance with the command signal from the command signal generating circuit 23.

The switching circuit 22 applies the image signals held by the latch circuit 21 to the segmented layers of the ion modulation electrode 9, in accordance with a predetermined order or sequence.

By applying the image signals in parallel to the groups of the ion modulation electrode, it is possible to obtain a longer ion modulating time for each group, so that the recording speed can be increased and the maximum frequency of the image signal is increased also.

More specifically, representing the number of element of the image signal held at one time by the latch circuit 21 by m, the maximum frequency of the image signal is given as mf, representing the maximum frequency when no image signal is held by f. Thus, the maximum frequency of the recordable image signal is increased as the number of groups of the segmented layer is small, i.e. as the number m of element image signal holdable at one time is increased.

The number of hold bits for obtaining a practically usable resolution and scanning speed is determined as follows. The scanning speed, in this case, means the relative speed between the ion modulation electrode 9 and rotary drum 12 as shown in FIG. 1.

Representing the resolution by P dots/mm, recording width by L mm and vertical scanning speed by V mm/sec, the frequency F of the image signal is represented by the following equation.

$$F = P^2 \times L \times V \qquad (2)$$

From the equations (1) and (2), the minimum number of the hold bits is given as in the following Table. It is, however, assumed that the resolution is 12 dots/mm and the recording width is 300 mm.

| scanning speed (mm/sec) | 100 | 200 | 300 | 400 |
|---|---|---|---|---|
| frequency of image signal KHz | 4320 | 8640 | 12960 | 17280 |
| minimum hold bit number | 18 | 35 | 44 | 70 |

In the modern office copiers, the vertical scanning speed, i.e. the line speed of copying, has to be at least about 100 mm/sec. Therefore, in view of the mobility of the ion, the hold bit number is preferably greater than 18, when ion modulation electrode is used.

The embodiment shown in FIG. 2 is arranged for the processing of digital image signals. This circuit, however, can be modified for the processing of analog image signals, by substituting a multiplexer for the shift register 20, sample hold circuit for the latch circuit 21, and an amplifier for the switching circuit 22.

As has been described, according to the invention, the ion modulation electrode is divided into a plurality of groups and the image signals are successively held and applied to respective groups, so that the recording speed is increased advantageously, as well as the maximum frequency of the recordable image signal. In consequence, the use of an image reproducing method incorporating ion modulation electrode, which inherently has a high resolution and good half tone reproduction, will be further spread and widened.

What is claimed is:

1. In a method of image reproduction using an ion modulation electrode for receiving an information-containing signal of sequentially input information elements and for forming on a relatively moving charge receptor an image corresponding to the information contained in the signal, the ion modulation electrode including at least a row of apertures defined transverse to the direction of charge receptor relative movement and through which ions are directed to form portions of the image at points on the charge receptor substantially corresponding to the locations of the apertures, the steps of:

(A) dividing the ion modulation electrode into a plurality of groups disposed in end-to-end relation transverse to the direction of charge receptor relative movement, each said group including a predetermined plural number of the apertures, such that each group is individually actuatable to impress on a corresponding portion of the charge receptor an image corresponding to the information signal applied to that group;

(B) receiving the information signal and storing a sequentially input portion thereof, said stored portion containing a predetermined number of sequentially input elements corresponding to the number thereof concurrently appliable to each group of the ion modulation electrode;

(C) applying the stored portion of the information signal simultaneously to all of said groups of the ion modulation electrode;

(D) actuating only the electrode group corresponding to the position on the charge receptor at which the image resulting from said stored portion should be impressed, to thereby place an image on the charge receptor; and p1 (E) repeating said steps (B), (C) and (D) so long as the information signal from which the image is to be formed on the charge receptor is present;

such that the concurrent impression on the charge receptor of a sequentially input number of the information signal elements by application of said signal portion to a plural apertures electrode group and accompanying actuation of that group—rather than mere sequential application of individual elements of the information signal to the electrode for sequentially actuated ion projection through corresponding individual ones of the electrode apertures—enables receipt and use of a higher frequency information signal with a corresponding increase in effective image recording speed on the charge receptor.

2. In a method in accordance with claim 1, said predetermined number of elements in the stored portion of the information signal being greater than 18.

3. In a method in accordance with claim 1, said information signal being a digital signal.

4. In a method in accordance with claim 1, said information signal being an analog signal.

5. In an image recording apparatus,
an ion generator,
an ion modulation electrode for modulating an ion flow generated by said ion generator and divided electrically into a plurality of groups disposed in end-to-end relation,
a charge receptor for receiving the modulated ion flow and disposed for relative movement with respect to said electrode in a direction transverse to the end-to-end relation of said electrode groups, and
means for receiving an information containing signal formed of sequential information elements and for applying to said groups a predetermined sequentially received number of said information elements for impression on said charge receptor of an ion flow modulated concurrently by said sequentially received number of information elements, thereby effectively increasing the rate at which an image corresponding to an information signal is impressible on the charge receptor.

6. In an apparatus in accordance with claim 5, each said group of the ion modulation electrode including a predetermined number of apertures defined in a row extending transverse to the direction of relative charge receptor movement and through which said modulated ion flow is directed for receipt on the charge receptor, and the predetermined number of said apertures substantially corresponding to the number of said information signal elements concurrently applied to said groups.

7. In an apparatus in accordance with claim 5, wherein said means applies said predetermined number of information signal elements simultaneously to all said groups, said means further actuating only a selected one of said groups to which the information signal elements are simultaneously applied so that the applied signal is impressed on said charge receptor by only said selected group at an intended location on the charge receptor.

8. In an apparatus in accordance with claim 5, said means comprising a command signal generating circuit and an ion modulation electrode driving circuit.

9. In an apparatus in accordance with claim 8, said ion modulation electrode driving circuit comprising a shift register, a latch circuit, a switching circuit and a continuous layer driving circuit.

* * * * *